(12) United States Patent
Jajtic et al.

(10) Patent No.: US 8,062,200 B2
(45) Date of Patent: Nov. 22, 2011

(54) TOOL-CHANGING DEVICE HAVING A DIRECTLY DRIVEN STROKE AND PIVOTING ACTUATOR

(75) Inventors: Zeljko Jajtic, München (DE); Maximilian Klaus, Stuttgart (DE)

(73) Assignee: Siemens Aktiengesellschaft, München (DE)

( * ) Notice: Subject to any disclaimer, the term of this patent is extended or adjusted under 35 U.S.C. 154(b) by 558 days.

(21) Appl. No.: 12/244,824

(22) Filed: Oct. 3, 2008

(65) Prior Publication Data

US 2009/0258770 A1 Oct. 15, 2009

(30) Foreign Application Priority Data

Oct. 4, 2007 (EP) .................................. 07019479

(51) Int. Cl.
*B23Q 3/157* (2006.01)

(52) U.S. Cl. ......... 483/44; 483/39; 310/12.14; 310/181; 310/12.24; 414/729; 414/744.3

(58) Field of Classification Search .............. 483/38–39, 483/44, 902; 310/12.14, 181, 190–191, 12.24, 310/15, 17; 414/729, 736, 744.3, 744.2
See application file for complete search history.

(56) References Cited

U.S. PATENT DOCUMENTS

| | | | |
|---|---|---|---|
| 5,928,120 A * | 7/1999 | Kameyama | 483/38 |
| 6,137,195 A | 10/2000 | Chitayat | |
| 6,508,314 B2 * | 1/2003 | Akamatsu et al. | 483/41 |
| 7,070,549 B1 * | 7/2006 | Sun | 483/39 |
| 7,070,550 B1 * | 7/2006 | Sun | 483/39 |
| 7,775,954 B2 * | 8/2010 | Liu | 483/39 |
| 2002/0180280 A1 | 12/2002 | Hsiao | |
| 2004/0176228 A1 * | 9/2004 | Kojima et al. | 483/1 |
| 2009/0212644 A1 * | 8/2009 | Bott et al. | 310/12.14 |

FOREIGN PATENT DOCUMENTS

| | | |
|---|---|---|
| DE | 102 61 796 A1 | 7/2004 |
| DE | 103 54 441 A1 | 6/2005 |
| DE | 10 2005 019 112 A1 | 10/2006 |
| EP | 1 048 401 A2 | 11/2000 |
| JP | 09-253967 A * | 9/1997 |
| WO | WO-2010/003642 A2 * | 1/2010 |

OTHER PUBLICATIONS

Machine Translation of DE 10261796, which De '796 was published Jul. 2004.*

Machine Translation of JP 9-253967, which JP '986 was published in Sep. 1997.*

* cited by examiner

*Primary Examiner* — Erica E Cadugan

(74) *Attorney, Agent, or Firm* — Henry M. Feiereisen; Ursula B. Day

(57) ABSTRACT

A tool-changing device includes a tool gripper and a stroke and pivoting actuator for operating the tool gripper. The stroke and pivoting actuator can be driven by a first direct drive for producing a linear movement and by a second direct drive for producing a rotational movement, wherein the first and the second direct drives have a common rotor which serves as the stroke and pivoting actuator.

15 Claims, 3 Drawing Sheets

TOOL-CHANGING DEVICE HAVING A DIRECTLY DRIVEN STROKE AND PIVOTING ACTUATOR

CROSS-REFERENCES TO RELATED APPLICATIONS

This application claims the priority of European Patent Application, Serial No. EP 07019479, filed Oct. 4, 2007, pursuant to 35 U.S.C. 119(a)-(d), the content of which is incorporated herein by reference in its entirety as if fully set forth herein.

BACKGROUND OF THE INVENTION

The present invention relates, in general, to a tool-changing device.

Nothing in the following discussion of the state of the art is to be construed as an admission of prior art.

Tool-changing devices, also designated as tool changers, are provided for changing tools on machining centers, machine tools and production machines. A tool-changing device is a mechanical device for automatically changing tools or process-related aids, such as measuring probes, grippers or plug gages, the tools being introduced as replacements into a machining spindle or the like from a tool magazine, and vice versa. The changing operation is effected, for example, with single or double grippers, the tool-changing time having a direct effect on the machining time of the machining center.

Tools are changed essentially via a combination of a stroke movement and a pivoting movement. In order to keep the non-productive times short, in particular the tool-changing times, dynamic and rigid positioning drives having low inertia masses are required for tool changers.

Tool changers can be driven via separate motors (electric, pneumatic, hydraulic) or via a link by means of a cam plate. With conventional technology, however, the high dynamics required are associated with high wear and thus low availability.

It would therefore be desirable and advantageous to provide an improved tool-changing device to obviate prior art shortcomings and to enable a quick and dynamic tool change.

SUMMARY OF THE INVENTION

According to one aspect of the present invention, a tool-changing device includes a tool gripper, and a stroke and pivoting actuator for operating the tool gripper, a first direct drive for implementing a linear movement of the stroke and pivoting actuator, and a second direct drive for implementing a rotational movement of the stroke and pivoting actuator, wherein the first and the second direct drives have a common rotor which serves as the stroke and pivoting actuator.

The tool-changing device according to the invention has a stroke and pivoting actuator for performing stroke and pivoting movements. The stroke and pivoting actuator can be driven by means of two direct drives, a first direct drive being arranged for producing a linear movement (stroke movement) and a second direct drive being arranged for producing a rotational movement (pivoting movement). The stroke and pivoting actuator is designed in such a way that both pivoting movements and rotational movements, i.e. rotations greater than 360°, can be performed with the second direct drive.

The first direct drive can be designed as a solenoid linear motor, i.e. a linear motor having solenoid coils, also designated as ring or cylindrical coils, and the second direct drive can be designed as a torque motor.

In accordance with the invention, the first and second direct drives have a common rotor, also designated as reaction part, with the rotor at the same time being the stroke and pivoting actuator.

In accordance with the invention, a solenoid linear motor for the stroke movement may be combined with a torque motor for realizing the pivoting movement. In this case, both actuators jointly use a reaction part (rotor) which is advantageously designed in the form of a hollow shaft. The stroke axis and pivoting axis can be moved independently of one another. The use of direct drives in both axes increases the dynamics and the dynamic disturbance rigidity.

Through the use of a common reaction part for stroke movement and pivoting movement, the inertia masses of the individual axes of the tool changer can be markedly reduced and at the same time the mechanical rigidity can be increased.

Since the rotor or the reaction part is advantageously designed in the form of a hollow shaft, the tool gripper can be supplied with media, which are necessary for the operation of the tool gripper (tool-changing pincers) and/or of a tool, via pneumatic or hydraulic supply lines which are directed through the hollow rotor. Arranged in this case in particular on the end of the stroke and pivoting actuator opposite the tool gripper can be a rotary leadthrough transmission, through which the lines are inserted into the stroke and pivoting actuator from outside.

The rotor, which constitutes the stroke and pivoting actuator, may have a reluctance profile with teeth and slots distributed uniformly both in the circumferential direction and in the axial direction, with the rotor being of uniform structure over its entire axial extent. The rotor is accordingly free of active means for producing magnetic fields and is designed merely as a reaction part having means for directing magnetic fields, for example made of iron or steel. Such reaction parts are cost-effective and are simple to produce.

Nonferritic material may be advantageously arranged in the slots of the reluctance profile in such a way that the rotor has an essentially smooth surface.

The slots are closed flush, such that the rotor or the stroke and pivoting actuator can be mounted and sealed like a pneumatic or hydraulic cylinder. Therefore the stroke and pivoting actuator can at the same time serve as a guide, for example a sliding guide or ball bush, for the direct drives. As a result, the cost of construction is reduced since there are fewer mechanical components due to the omission of gearing and couplings.

Each direct drive may have a stator component, i.e. there is a first and a second stator component. Both stator components may form a stator unit, with the stator unit being fixedly connected to a machine frame. Alternatively, the stator unit may also have a housing via which the stator unit is connected to the machine frame. Since the connection lines for the direct drives are connected to the stator unit, the connection lines together with the stator unit need not be moved along, as a result of which the dynamics of the tool-changing device are further increased.

Each stator component may have a single- or multi-phase winding. In particular, a three-phase winding for connection to a three-phase system can be provided. The winding of the first stator component of the first direct drive, which is provided for producing the linear or stroke movement, is in this case formed by means of solenoid coils, also designated as cylindrical or ring coils. The winding of the second stator component can be constructed by means of known concentrated or distributed winding.

According to another feature of the invention, permanent magnets may be arranged on each stator component in addition to the winding. Therefore each stator component has two active means for producing magnetic fields, as a result of which a higher force density is achieved. This is therefore advantageous since the rotor is free of active means for producing magnetic fields.

Different force and/or torque requirements can be imposed on the stroke and pivoting actuator depending on the size of the tools to be changed. The force or the torque can advantageously be set by arranging further stator components. In particular, the torque can be scaled by connecting a plurality of stator components in parallel, i.e. the torque can be doubled if a further two stator components are arranged (such that there are a total of four stator components).

In linear direct drives, it is known to use pneumatic or hydraulic weight compensation for relieving the drive during operation and for safety in the event of malfunctions. The stroke and pivoting actuator of the tool-changing device according to the invention can be extended by this function in a simple manner by the stroke and pivoting actuator at the same time being designed and functioning as a piston of a pneumatic or hydraulic cylinder. In this case, a pressure space of the cylinder is connected directly to an accumulator. The pressure of the closed system is set at such a level that the force due to weight is compensated for. The system volume in the cylinder and accumulator is dimensioned to be of such a size that the change in volume on account of the stroke movement of the piston rod causes only a slight change in pressure relative to the set system pressure.

A tool-changing device according to the invention works dynamically and quickly and is designed to be robust and largely free of wear, because due to the arrangement of the direct drives and the type of construction:

- a very compact stroke and pivoting module having direct force and torque transmission without mechanical transmission members affected by wear can be realized,
- the inertia masses of the two drives (final control elements) are very small on account of a common reaction part,
- high mechanical rigidity and drive rigidity on account of the hollow-shaft-shaped reaction part having a high mechanical resonant frequency are provided for.

The tool-changing device, also designated as tool changer, is provided for changing tools on machining centers, machine tools or production machines or also as an integrated drive of the tool breakage monitoring system and further similar machine tool applications in which an integrated stroke and pivoting drive on the basis of a cylindrical actuator ensures considerable advantages in terms of construction and drive.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
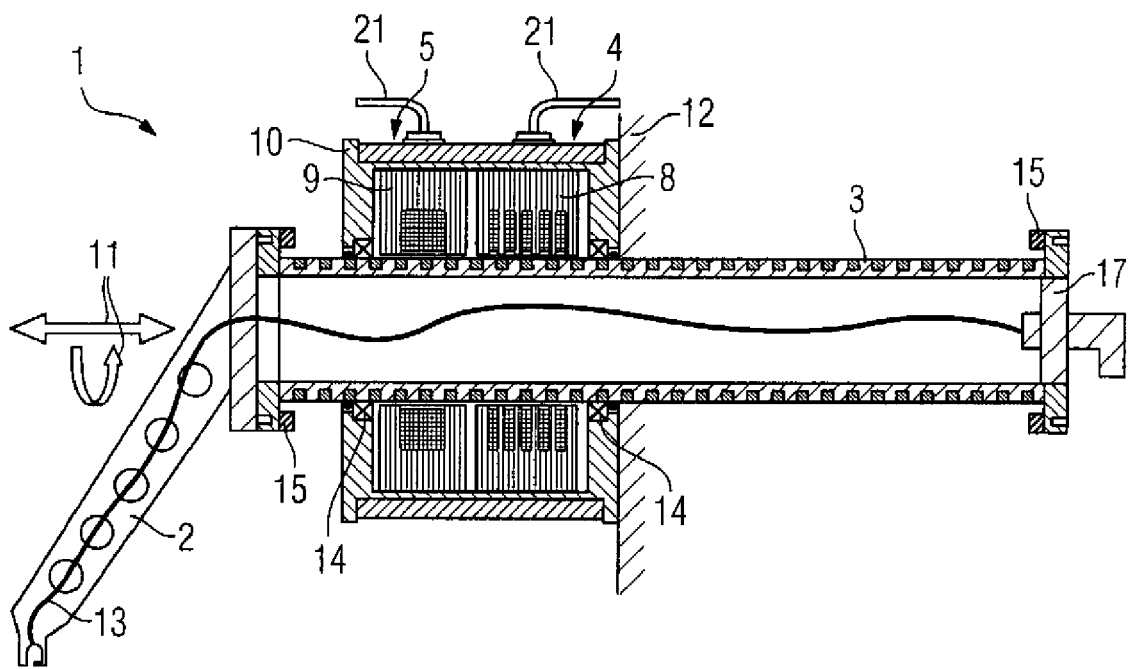
FIG. 1 shows a first configuration of a tool-changing device according to the invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a first configuration of a tool-changing device 1 according to the invention. The tool-changing device 1 has a tool gripper 2 and a stroke and pivoting actuator 3 for performing stroke and pivoting movements. The stroke and pivoting actuator 3 can be driven by means of two direct drives 4, 5, a first direct drive 4 being arranged for producing a linear movement (stroke movement) and a second direct drive 5 being arranged for producing a rotational movement (pivoting movement). The arrows 11 show the directions of movement of the stroke and pivoting actuator 3. The stroke and pivoting actuator 3 is designed in such a way that it can likewise perform rotations over 360°, for example a plurality of rotations about its own axis.

The first direct drive 4 is designed as a solenoid linear motor, i.e. a linear motor having solenoid coils, also designated as ring or cylindrical coils. On account of its functioning and mode of operation, the first direct motor 4 is also designated as a direct-axis flux motor.

The second direct drive 5 is designed as a torque motor, wherein the second direct drive 5, on account of its functioning and mode of operation, can also be designated as a transverse flux motor.

The first and second direct drives 4, 5 have a common rotor, also designated as reaction part, which is the stroke and pivoting actuator 3.

A first direct drive 4 for the stroke movement is combined with a second direct drive 5 for realizing the pivoting movement. In this case, both direct drives 4, 5 jointly use a reaction part (stroke and pivoting actuator 3).

The stoke and pivoting actuator 3 is designed in the form of a hollow shaft. As a result, the tool gripper 2 can be supplied with media, which are necessary for the operation of the tool gripper (tool-changing pincers) and/or of a tool, via pneumatic or hydraulic supply lines 13 which are directed through the hollow stroke and pivoting actuator 3. Arranged in this case on the end of the stroke and pivoting actuator 3 opposite the tool gripper 2 is a rotary transmission leadthrough 17, through which the lines 13 are inserted into the stroke and pivoting actuator 3 from outside.

Each direct drive 4, 5 has a stator component, i.e. there is a first and a second stator component 8, 9. Both stator components 8, 9 form a stator unit 10, the stator unit 10 being fixedly connected to a machine frame 12. The stator unit 10 is mounted on the stroke and pivoting actuator 3 by means of the bearings 14. The bearings 14 are designed, for example, as antifriction bearings, such as ball bearings.

Since the connection lines 21 for the direct drives 4, 5, i.e. in particular for the stator components 8, 9, are connected to the stator unit 10, the connection lines 21 together with the stator unit 10 need not be moved along, as a result of which the dynamics of the tool-changing device 1 are further increased.

Furthermore, an end-of-travel damper 15 is arranged on each end of the stroke and pivoting actuator 3, said end-of-travel dampers 15 damping shocks of the moving stroke and pivoting actuator 3 at its end regions.

Figure 2:
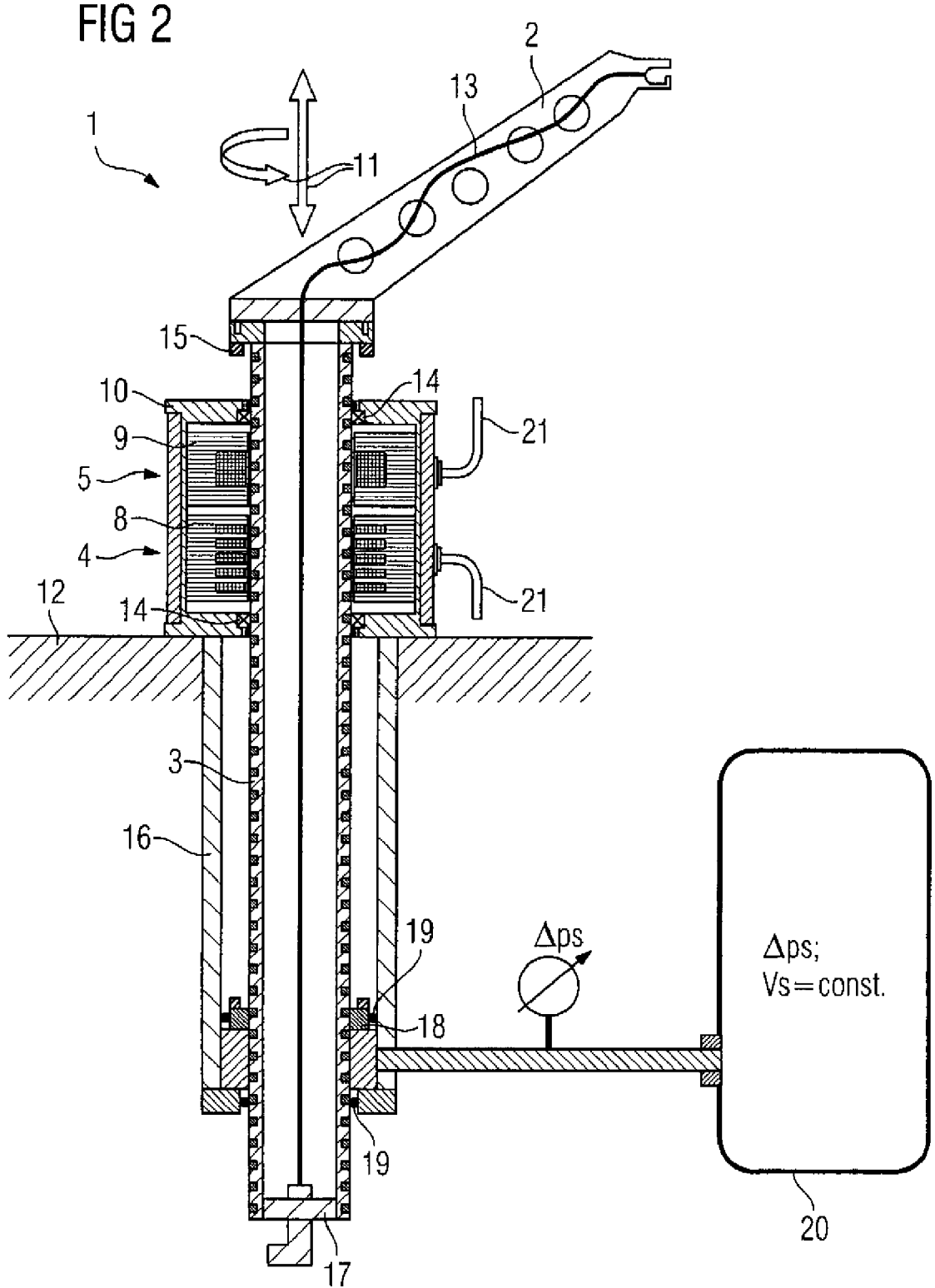
FIG. 2 shows a second configuration of a tool-changing device according to the invention.

FIG. 2 shows a second configuration of a tool-changing device 1 according to the invention which essentially corresponds to the tool-changing device 1 according to FIG. 1.

According to FIG. 2, the stroke and pivoting actuator 3 is at the same time designed as a cylinder piston, having an end-of-travel cushion 18, of a pneumatic cylinder 16 having a cylinder seal 19 in order to ensure pneumatic weight compensation for relieving the drives 4, 5 during operation and for safety in the event of malfunctions. In this case, a pressure space of the cylinder 16 is connected directly to an accumulator 20. The pressure of the closed system is set at such a level that the force due to weight is compensated for. The system volume in the cylinder 16 and accumulator 20 is dimensioned to be of such a size that the change in volume on account of the stroke movement of the piston rod, i.e. stroke and pivoting actuator 3, causes only a slight change in pressure relative to the set system pressure.

Figure 3:
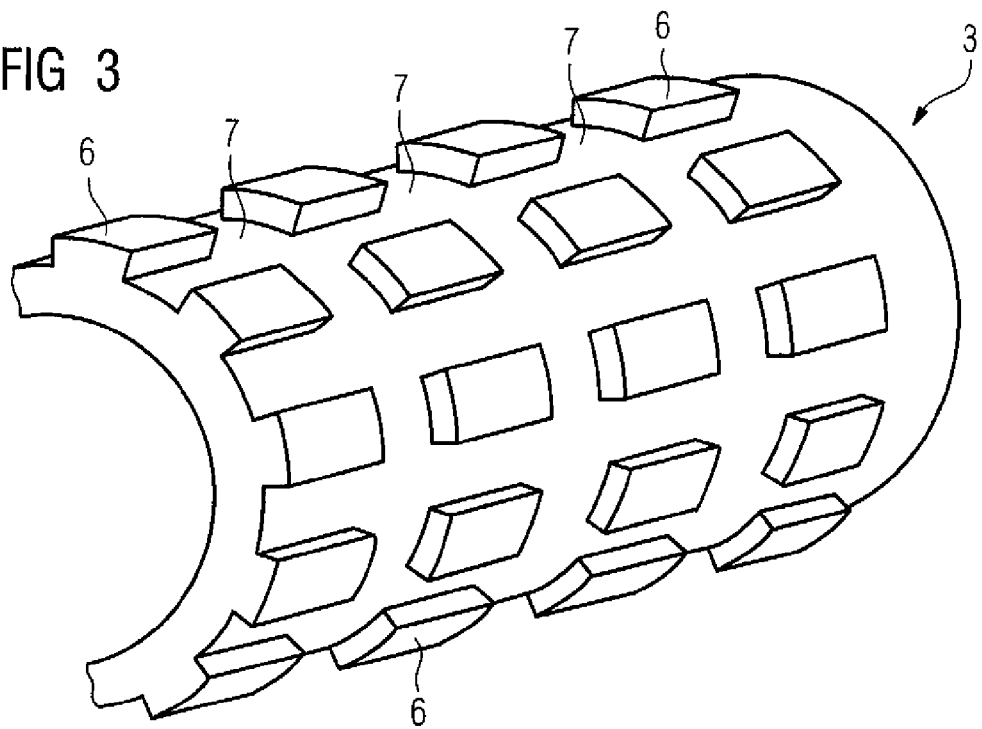
FIG. 3 shows a configuration for a stroke and pivoting actuator (rotor)

FIG. 3 shows a configuration for a stroke and pivoting actuator 3. The stroke and pivoting actuator is designed in the form of a hollow shaft and has teeth 6 and slots 7 on its surface. The slots 7 are present in the axial direction and circumferential direction, thereby resulting in rectangular teeth 6. The stroke and pivoting actuator 3 has no winding or permanent magnets, such that it has only a reluctance effect.

Figure 4:
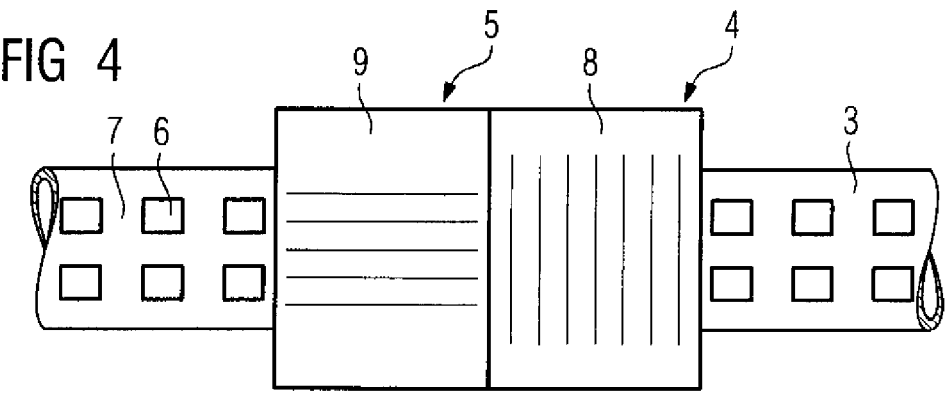
FIG. 4 shows a diagrammatic illustration of a stroke and pivoting actuator (rotor) with stator unit.

FIG. 4 shows a diagrammatic illustration of the stroke and pivoting actuator 3 with stator unit 10. The stator components 8, 9 are arranged axially directly next to one another. They drive the common rotor, which is the stroke and pivoting actuator 3, which has the same structure over its entire axial length. This means that the first direct drive 4 (linear drive) and the second direct drive 5 (rotational drive) can jointly use the stroke and pivoting actuator 3 at virtually all the axial positions. In addition, the entire length of the stroke and pivoting actuator 3 can be used for force and torque formation. Furthermore, it is advantageous that, even in the case of large strokes, the stator components 8, 9 can be fitted together very closely, such that a compact type of construction can be ensured.

Each stator component 8, 9 has a single- or multi-phase winding (shown schematically). In particular, a three-phase winding for connection to a three-phase system is provided in each case. The winding of the first stator component 8 of the first direct drive, which is provided for producing the linear or stroke movement, is in this case formed by means of solenoid coils, also designated as cylindrical or ring coils. The winding of the second stator component 9 is constructed by means of a known concentrated or distributed winding.

Furthermore, permanent magnets are arranged on each stator component 8, 9 in addition to the winding. Therefore each stator component 8, 9 has two active means for producing magnetic fields, as a result of which a higher force density is achieved. This is therefore advantageous since the stroke and pivoting actuator 3 (rotor) is free of active means for producing magnetic fields. Therefore the stroke and pivoting actuator 3 can be produced in a simple and cost-effective manner.

Figure 5:
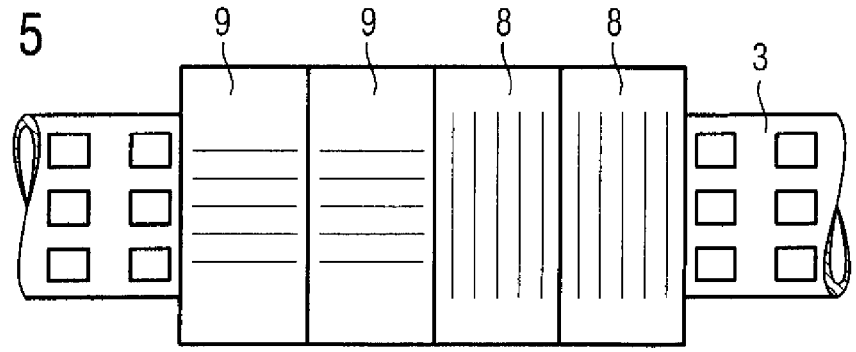
FIG. 5 shows a diagrammatic illustration of a stroke and pivoting actuator (rotor) with a plurality of stator components.

FIG. 5 shows a diagrammatic illustration of a stroke and pivoting actuator 3 with a plurality of stator components 8, 9. In particular, two stator components 8 and two stator components 9 are arranged in each case. The force or the torque can therefore be set by arranging further stator components 8, 9, in accordance with the desired requirement.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A tool-changing device configured and arranged for exchanging tools between a machine tool and a tool magazine, the tool changing device comprising:
   a tool gripper; and
   a stroke and pivoting actuator for operating the tool gripper, the stroke and pivoting actuator including a rotary transmission leadthrough for at least one of pneumatic and hydraulic supply lines for supplying at least one of the tool gripper and a tool;
   a first direct drive for directly implementing a linear movement of the stroke and pivoting actuator; and
   a second direct drive for directly implementing a rotational movement of the stroke and pivoting actuator about an axis,
   wherein the first and the second direct drives have a common reaction part which serves as the stroke and pivoting actuator.

2. The tool-changing device of claim 1, wherein the stroke and pivoting actuator is designed cylindrically in the form of a hollow shaft.

3. The tool-changing device of claim 1, wherein the stroke and pivoting actuator has a reluctance profile with teeth and slots distributed uniformly both in a circumferential direction and in an axial direction.

4. The tool-changing device of claim 3, further comprising nonferritic material arranged in the slots of the reluctance profile in such a way that the stroke and pivoting actuator has an essentially smooth surface.

5. The tool-changing device of claim 1, wherein the first direct drive has a first stator component and the second direct drive has a second stator component, both stator components forming a stator unit.

6. The tool-changing device of claim 5, further comprising a machine frame, said stator unit being fixedly connected to the machine frame.

7. The tool-changing device of claim 5, wherein the stator unit is constructed to provide a guide for the stroke and pivoting actuator, with the guide being designed as a sliding guide.

8. The tool-changing device of claim 5, wherein the stator unit is constructed to provide a guide for the stroke and pivoting actuator, with the guide being designed as a ball bush.

9. The tool-changing device of claim 5, wherein each of the first and second stator components has a single phase winding and permanent magnets.

10. The tool-changing device of claim 9, wherein the winding of the first stator component has solenoid coils.

11. The tool-changing device of claim 5, wherein each of the first and second stator components has a multi-phase winding and permanent magnets.

12. The tool-changing device of claim 11, wherein the winding of the first stator component has solenoid coils.

13. The tool-changing device of claim 5, further comprising further first and/or second stator components, with a plurality of stator components being connected in parallel.

14. The tool-changing device of claim 1, wherein end-of-travel dampers are arranged on each end of the stroke and pivoting actuator.

15. The tool-changing device of claim 1, wherein the stroke and pivoting actuator is designed as a piston of a pressure cylinder, with the cylinder defining a pressure space which is connected directly to an accumulator.

* * * * *